(12) United States Patent
Dickinson et al.

(10) Patent No.: US 9,919,674 B2
(45) Date of Patent: Mar. 20, 2018

(54) TETHERED FASTENER APPARATUS AND METHOD

(71) Applicants: Daniel James Dickinson, Lincolnshire, IL (US); Michael Walter Smith, Palatine, IL (US); Michael Tirrell, Volo, IL (US); John Clasen, Crystal Lake, IL (US)

(72) Inventors: Daniel James Dickinson, Lincolnshire, IL (US); Michael Walter Smith, Palatine, IL (US); Michael Tirrell, Volo, IL (US); John Clasen, Crystal Lake, IL (US)

(73) Assignee: TERMAX LLC, Lake Zurich, IL (US)

( * ) Notice: Subject to any disclaimer, the term of this patent is extended or adjusted under 35 U.S.C. 154(b) by 379 days.

(21) Appl. No.: 14/722,148

(22) Filed: May 27, 2015

(65) Prior Publication Data

US 2015/0251624 A1 Sep. 10, 2015

Related U.S. Application Data

(63) Continuation-in-part of application No. 14/511,223, filed on Oct. 10, 2014, now abandoned, which is a continuation-in-part of application No. 13/372,497, filed on Feb. 14, 2012, now abandoned.

(51) Int. Cl.
*B60R 13/04* (2006.01)
*B60R 21/216* (2011.01)

(52) U.S. Cl.
CPC .... *B60R 21/216* (2013.01); *B60R 2021/2163* (2013.01); *Y10T 24/33* (2015.01); *Y10T 24/3907* (2015.01); *Y10T 24/3909* (2015.01); *Y10T 29/49959* (2015.01)

(58) Field of Classification Search
CPC .... A01N 2300/00; A01N 59/16; A01N 59/14; A01N 43/12; A01N 45/00; A01G 2031/005; A01G 31/001; A01G 31/00; C05C 11/00; C05G 3/0076
USPC ...................................................... 296/187.12
See application file for complete search history.

(56) References Cited

U.S. PATENT DOCUMENTS

| | | | |
|---|---|---|---|
| 6,196,756 B1* | 3/2001 | Leverger | B60J 3/023 403/326 |
| 6,857,168 B2* | 2/2005 | Lubera | B60N 3/026 24/293 |
| 6,928,705 B2* | 8/2005 | Osterland | B60R 13/0206 24/289 |

(Continued)

*Primary Examiner* — Kiran B Patel

(57) ABSTRACT

A tether fastening device for an automobile body structure includes a fastener clip, at least one tether strap, a tether clip bracket, a clip strap coupler, and a bracket strap coupler. The clip strap coupler operably couples to a slot in the automobile chassis. The tether clip bracket attaches to the fastener clip when in an attached position. The bracket strap coupler is attached to the body panel.

The tether strap allows for controlled detachment between the clip strap coupler and the bracket strap coupler. The strap may include a mesh to absorb the deployment energy and decelerate the body panel in a controlled manner. In the event of an airbag activation, the tether clip bracket and the fastener clip initially accelerate and then decelerate from each other. The pair of tether straps control the deceleration and separation distance of the clip strap coupler and bracket strap coupler.

16 Claims, 13 Drawing Sheets

(56) References Cited

U.S. PATENT DOCUMENTS

| | | | | |
|---|---|---|---|---|
| 7,051,408 B2* | 5/2006 | De Azevedo | F16B 2/241 | 24/289 |
| 7,287,945 B2* | 10/2007 | Lubera | F16B 5/065 | 24/295 |
| 7,337,505 B1* | 3/2008 | Scroggie | F16B 5/0657 | 24/297 |
| 7,351,023 B2* | 4/2008 | Scroggie | F16B 5/123 | 24/297 |
| 7,419,206 B2* | 9/2008 | Slobodecki | B60J 3/0217 | 24/289 |
| 8,282,047 B2* | 10/2012 | Franks | F16B 2/08 | 24/16 R |
| 8,474,111 B2* | 7/2013 | Ribes Marti | B60R 21/213 | 24/292 |
| 8,677,573 B2* | 3/2014 | Lee | B60R 13/0206 | 24/289 |
| D708,044 S * | 7/2014 | Komeno | D8/356 | |
| D709,354 S * | 7/2014 | Komeno | D8/356 | |
| 8,800,120 B2* | 8/2014 | Benedetti | F16B 5/0642 | 24/282 |
| 8,806,722 B2* | 8/2014 | Iwahara | F16B 21/086 | 24/297 |
| 8,832,907 B2* | 9/2014 | De Jong | F16B 21/07 | 24/292 |
| 8,875,357 B2* | 11/2014 | Reznar | B60J 3/0217 | 24/289 |
| 9,080,588 B2* | 7/2015 | Diez Herrera | F16B 21/075 | |
| 9,488,209 B2* | 11/2016 | Camus | F16B 21/075 | |
| 9,541,113 B2* | 1/2017 | Morris | F16B 5/07 | |
| 9,562,554 B2* | 2/2017 | Vidal | F16B 5/0258 | |
| 9,592,786 B2* | 3/2017 | Yamamoto | F16B 19/1081 | |
| 9,649,993 B1* | 5/2017 | Dickinson | B60R 13/0206 | |
| 9,657,759 B2* | 5/2017 | Benedetti | F16B 5/0657 | |
| 9,821,747 B2* | 11/2017 | Benedetti | F16B 21/086 | |
| 2002/0194710 A1* | 12/2002 | Dickinson | F16B 5/0614 | 24/295 |
| 2004/0083582 A1* | 5/2004 | Dickinson | F16B 5/0614 | 24/295 |
| 2005/0105987 A1* | 5/2005 | Giugliano | F16B 5/065 | 411/508 |
| 2006/0168773 A1* | 8/2006 | Smith | B60R 13/0206 | 24/295 |
| 2006/0290155 A1* | 12/2006 | Smith | B60R 11/00 | 296/29 |
| 2008/0028577 A1* | 2/2008 | Soman | F16B 21/075 | 24/293 |
| 2008/0066266 A1* | 3/2008 | Scroggie | B60R 13/0206 | 24/297 |
| 2008/0086850 A1* | 4/2008 | Smith | B60R 13/0206 | 24/289 |
| 2008/0098576 A1* | 5/2008 | Smith | B60R 11/00 | 24/297 |
| 2008/0289155 A1* | 11/2008 | Kim | B60J 3/0213 | 24/295 |
| 2010/0026028 A1* | 2/2010 | Smith | B60R 13/0206 | 296/29 |
| 2010/0072735 A1* | 3/2010 | Kirchen | B60R 13/0206 | 280/728.2 |
| 2011/0163562 A1* | 7/2011 | Smith | B60R 13/0206 | 296/1.07 |
| 2012/0311829 A1* | 12/2012 | Dickinson | F16B 21/075 | 24/458 |
| 2013/0270868 A1* | 10/2013 | Tejero Salinero | F16B 5/02 | 296/191 |
| 2013/0340216 A1* | 12/2013 | Smith | F16B 2/22 | 24/564 |
| 2014/0263895 A1* | 9/2014 | Dickenson | B60R 13/0206 | 248/206.5 |
| 2015/0321622 A1* | 11/2015 | Dickinson | B60R 13/0206 | 24/458 |
| 2016/0016522 A1* | 1/2016 | Smith | F16B 37/043 | 296/35.1 |
| 2016/0047493 A1* | 2/2016 | Dickinson | F16L 3/08 | 248/73 |
| 2016/0138629 A1* | 5/2016 | Flynn | F16B 19/1081 | 411/57.1 |
| 2016/0144801 A1* | 5/2016 | Huelke | B60N 3/026 | 24/295 |
| 2016/0229368 A1* | 8/2016 | Dickinson | B60R 13/0275 | |
| 2016/0375840 A1* | 12/2016 | Dickinson | F16B 5/065 | 24/295 |
| 2017/0051780 A1* | 2/2017 | Dickinson | B29C 45/006 | |
| 2017/0113629 A1* | 4/2017 | Dickinson | B60R 13/0206 | |
| 2017/0113632 A1* | 4/2017 | Dickinson | B60R 13/02 | |
| 2017/0129421 A1* | 5/2017 | Dickinson | B60R 13/0206 | |

* cited by examiner

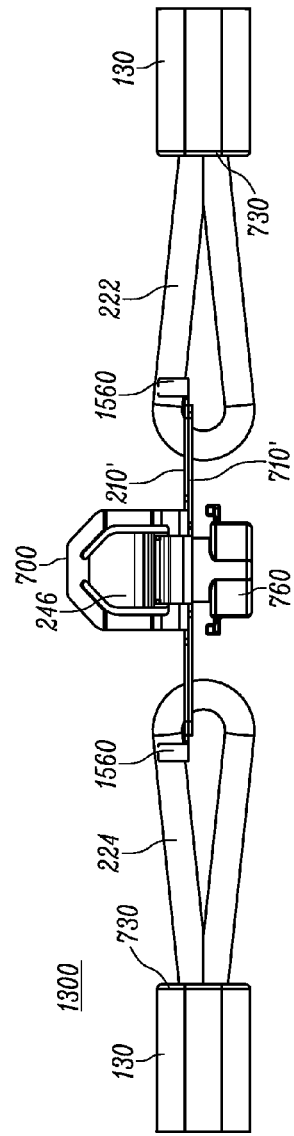
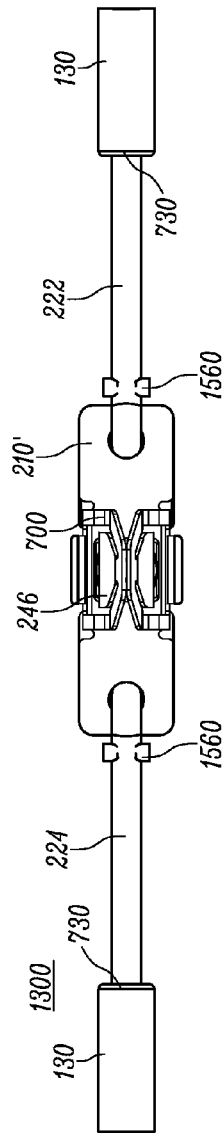
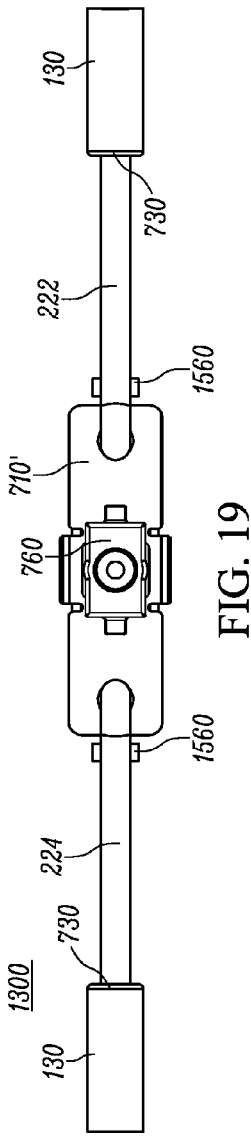
FIG. 17
FIG. 18
FIG. 19

TETHERED FASTENER APPARATUS AND METHOD

RELATED APPLICATIONS

This is a continuation in part application claiming priority from:

an application entitled "Tethered Fastener Apparatus and Method" having a Ser. No. 14/511,223, having a filing date of Oct. 10, 2014, an application entitled "Tethered Fastener Apparatus and Method" having a Ser. No. 13/372,497, having a filing date of Feb. 14, 2012, which is a continuation in part of:

U.S. Pat. No. 8,128,145 entitled "Tethered Fastener Apparatus and Method" filed on Jan. 28, 2007 which is a continuation in part of:

U.S. Pat. No. 7,178,850 entitled "Tethered Fastener Apparatus and Method" filed on Feb. 9, 2005.

The above-referenced patents and/or patent applications are hereby incorporated by reference herein in their entirety.

FIELD OF THE INVENTION

The invention relates generally to devices for fastening objects, and, more particularly, to a tethered fastener device for insertion into an engagement structure, such as a vehicle chassis, a hollow substrate, a wall, a plate or any suitable surface.

BACKGROUND OF THE INVENTION

A number of devices and fasteners are currently available for fastening panels, such as body panels and automobile interior and exterior trimpieces, to the chassis of a vehicle. As used herein, a body panel refers to, for example, any body panel, a plastic interior trimpiece, a body piece, or any suitable part or an interior trimpiece made out of any suitable material, such as wood, steel, aluminum, magnesium, carbon fiber, rubber, cloth or any suitable material. Additionally, the panel may be any suitable exterior body panel, such as a fender, bumper, quarter panel or door panel. The chassis of the vehicle may include any substrate, plate, body panel, structural framework, chassis component or subcomponent, wall or any suitable object.

However, with the advent of airbags placed throughout the interior of a vehicle, body panels and interior trimpieces may become ballistic and not detach necessarily in a safe, controlled manner. One problem is to safely facilitate deployment of these various airbags while minimizing the risk of body panels injuring passengers. For example, side curtain airbags or airbags that traverse down a window, seat, roof or along one chassis pillar to another chassis pillar typically travel from a storage position within the body panel along a predetermined path, in order to fully deploy the airbag and to protect occupants during a crash. Other types of airbags, such as "sausage-type" airbags and side curtain airbags, may operate in a similar fashion to protect the head as well as the chest region. As a result, these various body panels must safely disengage or detach from the vehicle chassis in a controlled manner in order to permit the airbag to, for example, deploy from within the body panel. Additionally, these body panels typically detach to permit the airbag to travel along the vehicle chassis via a rigid plastic strap or tether in a guided fashion, as is known in the art. Tether straps not integrated with the body panel fastener are known to be used to attach the body panel or interior trimpiece to the vehicle chassis in order to control the displacement of the interior trimpiece when detached.

However, when the interior trimpiece is fastened to the chassis during vehicle assembly, manual insertion of the interior trimpiece to the vehicle chassis requires attaching a separate tether strap between the interior trimpiece and the vehicle chassis in a separate step. As a result, a two-step process for attaching the body panel to the chassis is required, including the additional step of attaching the tether strap within the confines of the body panel and the vehicle chassis. These non-integrated, separate tether straps increase assembly costs, and therefore increase production costs, leading to higher vehicle prices because of the increased amount of labor involved when installing the tether straps between the interior trimpiece and the vehicle chassis. Further, the requirement for the separate installation of a tether strap between the interior trimpiece and the vehicle chassis further increases the likelihood of an inadvertent failure to properly attach the tether strap between the interior trimpiece and the vehicle chassis during assembly. If the non-integrated, separate tether strap is not properly installed, the interior trimpiece may detach in an uncontrolled manner and possibly come in contact with the vehicle passengers.

BRIEF DESCRIPTION OF THE DRAWINGS

The present invention is illustrated by way of example and not limitation in the accompanying figures, in which like reference numerals indicate similar elements, and in which:

FIGS. 17, 18 and 19 are side, top and bottom views of an attached body panel assembly in accordance with the alternative embodiment;

DETAILED DESCRIPTION OF THE PREFERRED EMBODIMENTS

Figure 1:
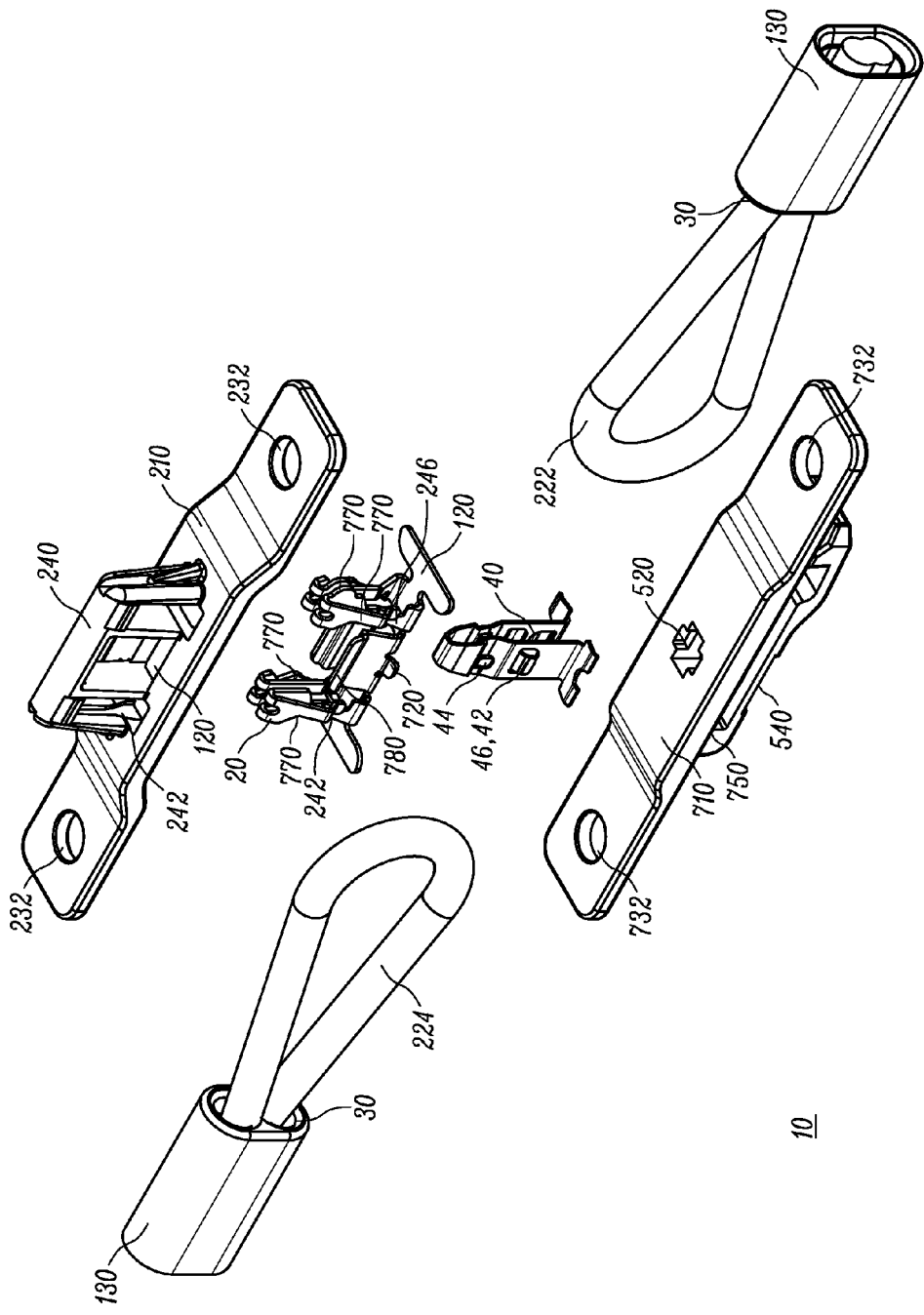
FIG. 1 is a perspective exploded view of a body panel assembly in accordance with an exemplary embodiment of the present invention.

A tether fastening device for an automobile body structure includes a fastener clip, at least one tether strap, a tether clip bracket, a clip strap coupler, and a bracket strap coupler. The clip strap coupler is operatively coupled to a slot in the automobile chassis. The tether clip bracket attaches to the fastener clip when in an attached position. The bracket strap coupler is attached to the body panel.

The tether strap allows for controlled detachment between the clip strap coupler and the bracket strap coupler. The strap may include a mesh to absorb the deployment energy and decelerate the body panel in a controlled manner. In the event of an airbag activation, the tether clip bracket and the fastener clip initially accelerate and then decelerate from each other. The pair of tether straps control the deceleration and separation distance of the clip strap coupler and bracket strap coupler.

Among other advantages, the tether strap forms a loop to couple the clip strap coupler and the bracket strap coupler. Alternatives to this strap for forming a loop, and for attaching the tether strap to the fastener clip, are by a screw, or nut and bold. The tether fastening device easily facilitates attachment of the fastening device with the body panel and vehicle chassis, while an integrated tether strap controls detachment of the fastener clip from the body panel. The tether strap is multi-strand reinforced and thus absorbs the deployment energy and decelerates the body panel in a controlled manner to avoid breakage of the strap. Alternatively, the tether strap includes a mesh reinforcement over an elastic material to strengthen the strap such that the strap resists breakage and does not allow the body panel to travel more than a predetermined distance. Since the tether fastening device includes an integrated strap, a body panel assembly may be preassembled with the strap and fastener clip already is attached and ready for attachment to a vehicle chassis in a single step. As a result, no separate step of attaching a tether strap to the vehicle is required. Since the tether strap is integrated into the fastener clip and delivered to, for example, an automobile manufacturer for final assembly, the automobile manufacturer may eliminate the step of attaching the strap to the vehicle chassis, since the tether strap is already integrated into the tether clip. Consequently, assembly costs are reduced, thus reducing a manufacturer's production costs. Further, the tether fastening device reduces or eliminates the chance of an improper attachment of the tether strap between the fastener clip, the vehicle chassis and the body panel, since the tether strap is already integrated with the fastener clip via a strap loop and is already attached to the body panel. In other words, the problem of inadvertently failing to attach the separate tether strap between the vehicle chassis and the body panel is greatly reduced or even eliminated. The tether strap facilitates controlled disengagement of the body panel and the vehicle chassis in order to permit deployment of an airbag, permitting the airbag to travel along a guided path that would otherwise be obstructed by the second engagement structure. Among other advantages, the use of the tether fastening device decreases production cost and increases productivity and efficiency while further increasing reliability and safety.

FIG. 1 is an exploded view of a body panel and tether fastening device 10 (FIGS. 1-8), 1300 (FIGS. 13-21) including a fastener clip 20 (FIGS. 1-8), 1300 (FIGS. 13-21), at least one tether strap 30, 222, 224 (FIGS. 1-8), 730 (FIGS. 13-21), a tether clip bracket 40, a clip strap coupler 210, 210' and a bracket strap coupler 710, 710'. The tether fastening device 10 attaches to a body panel 70 and to a slot 52 in an automobile chassis 50.

The clip strap coupler 210 and the fastener clip 20 are coupled to the automobile chassis 50. The fastener clip 20 is detachably coupled to the clip strap coupler 210. The tether clip bracket 40 is detachably coupled to the fastener clip 20. The bracket strap coupler 710 is attached to the body panel 60. A first multi-strand reinforced strap 30 is coupled to one end of both the clip strap coupler 210 and the bracket strap coupler 710. A second multi-strand reinforced strap 30 is coupled to an end opposite from the one end of both the clip strap coupler 210 and the bracket strap coupler 710.

The fastener clip 20, 700 attaches to the pair of tether straps 222, 224 via the clip strap coupler 210. Fastener clip 20, 700 may be coupled to the cap 240 via a slot of the base 120 of clip strap coupler 210. During air bag activation, clip 20 remains in slot 120 of the clip strap coupler 210.

The tether clip bracket 40 attaches to the pair of tether straps 222, 224 via the bracket strap coupler 710, 710'. The tether clip bracket 40 attaches to the fastener clip 20 when in an attached position as is typically the case after vehicle assembly. In the event of an airbag activation, the tether clip bracket 40 quickly separates from the fastener clip 20 during detachment. The pair of tether straps 222, 224 control the acceleration, deceleration and separation distance of the clip strap coupler 210 and bracket strap coupler 710. When deployed, the tether clip bracket 40 (with body piece 70) and the fastener clip 20 (attached to the chassis 50) initially accelerate and then decelerate from each other, to a safe predetermined distance.

Figure 2:
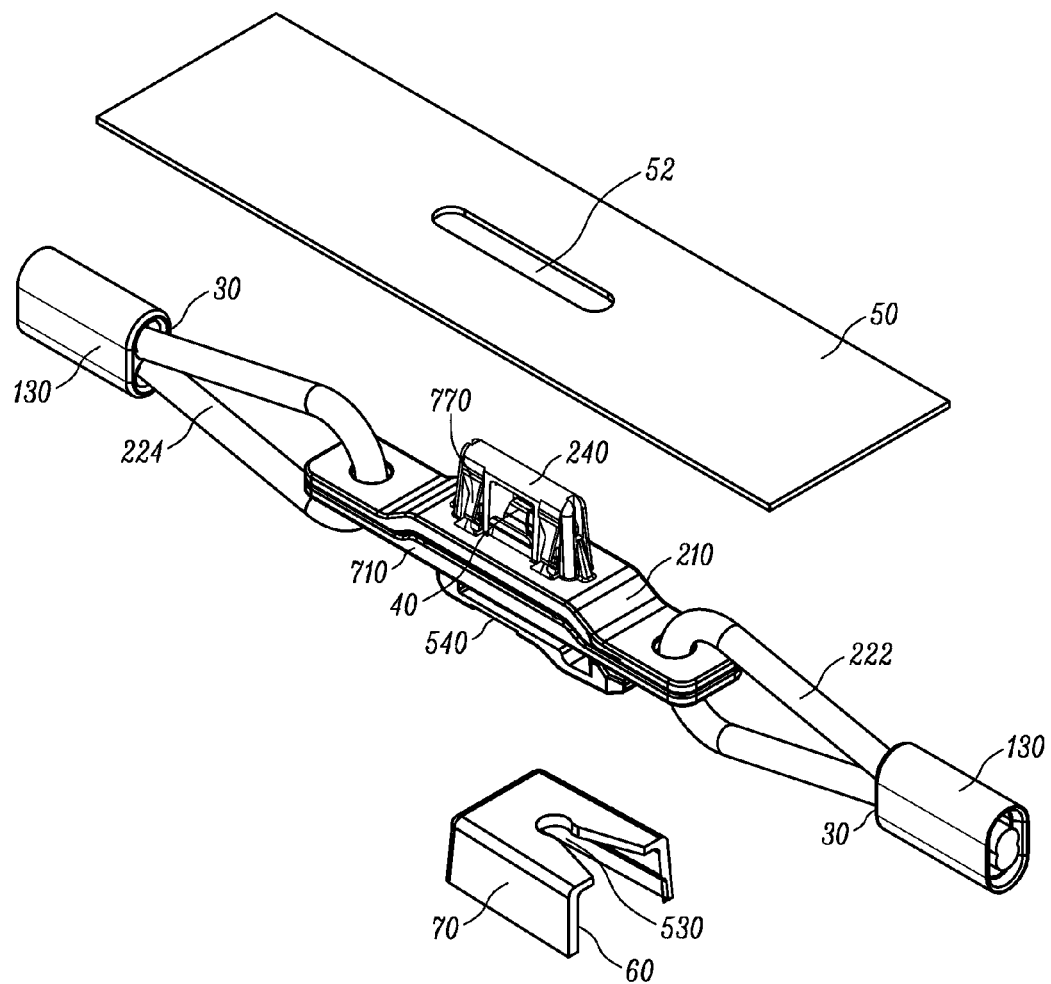
FIG. 2 is a perspective view of the body panel assembly according to one embodiment of the present invention.

As shown in FIG. 2 the tether clip bracket 40 and bracket strap coupler 710 may also attach to a body piece 60 that includes a tower or post portion of a body panel 70. The body piece 60 may be part of a plastic trimpiece, a body panel, such as a B-pillar body panel or any other suitable type of panel. According to another embodiment, the body panel 70 comprises a pre-assembled combination of both the tether clip bracket 40 and the body piece 60. For example, the tether clip bracket 40 and the body piece 60 are attached via a clip mechanism 540 as described below, or alternatively via welds, rivets screws, or other suitable fasteners. As an assembly, the body panel 70 attaches and detaches from fastener clip 20. The fastener clip 20 and tether clip bracket 40 may be made out of plastic, carbon fiber, fiberglass, steel, aluminum, magnesium, leather, rubber, wood or any other suitable type of material. According to one embodiment, the body piece 60 may be a plastic trimpiece cover for an A, B, and C-pillar in a vehicle chassis and may be made of polyvinyl chloride or any other suitable type of plastic as is known in the art. The body piece 60, via the fastening device 10 (including the fastener tether clip 20, 700 and the tether strap 30, 730, 222, 224) may couple or otherwise suitably attach to another engagement structure 50, such as a vehicle chassis, structural framework, body panel, wall, substrate or any other suitable object.

According to one embodiment, the clip strap coupler 210, 210' and the bracket strap coupler 710, 710' are attached via at least two arms 222, 224. The at least two arms 222, 224 may be tied or coupled for example through fastening mechanism 130 such as a clamp. The fastening mechanism 130 may be or may further include a clamp such as wire 1200, staple, wrap, "hog tie" or any suitable coupling mechanism. Optionally, fastening mechanism 130 is a cover or casing to cover clamp or wire 1200. Alternatively, three, four, five, six or more suitable number of flexible arms 222, 224 for each tether strap are contemplated.

The tether strap 30, 730, 222, 224 is a multi-strand reinforced strap and thus absorbs the deployment energy and decelerates the body panel 70 from the chassis 50 in a controlled manner to avoid breakage of the strap. For example, the tether strap 30, 730, 222, 224 includes a multi-stranded material such as a mesh reinforced material over an elastic material. The mesh reinforced material (mesh) strengthens the tether strap 30, 730, 222, 224 such that the elastic material on the tether strap 30, 730, 222, 224 elongates in a controlled manner, while the mesh resists breakage and does not allow the body panel 70 to travel more than a predetermined distance from the chassis 50.

The clip strap coupler 210, fastening mechanism 130, and the bracket strap coupler 710 and related components may be made of polyvinyl chloride or any suitable plastic, though any other suitable material, such as carbon fiber, wire or cable, may be used. The multi-stranded material may be a nylon mesh, a rope mesh, a metal mesh, a rubber, plastic, polyester, aluminum, steel, mesh or braid, bungee cord, or any suitable stranded material. Multi-stranded materials, such as rope or steel cables can withstand large tension forces and exhibit failure yield points of high levels and thus effectively prevent or significantly reduce tether strap 30, 730, 222, 224 failure. For example, if one or a few of the strands of a mesh or cable stretch or even break, the strain is evident while the remaining strands remain intact and continue to prevent breakage and secure the strap 30, 70, 222, 224. For example, evidence of strain of the strands or mesh may be used to determine reuse, reassembly and reinstallation of the strap 30, 730 and any component of the tether fastening device 10, 1300.

It should be understood that the implementation of other variations and modifications of the body panel and tether fastener assembly 10, 1300 (including 700) and its various aspects shown in the figures and described herein will be apparent to those having ordinary skill in the art, and that the invention is not limited by these specific embodiments described. The fastener tether clip 20 may be coupled to the tether clip bracket 40 in any suitable manner. For example, the tether clip bracket 40 includes a first wing 42 to engage a slot 520 on the bracket strap coupler 710. The bracket strap coupler 710 further comprises a hook finger 540 detachably coupled to a fastening mechanism 530 on the body panel 70.

The tether clip bracket 40 may further include a second wing 44 or pair of wings 44 forming a tapered point in order to guide clip bracket 40 into a corresponding slot 620 on the bottom of tether clip 20 to form the re-engagable coupling between clip bracket 40 and tether clip 20.

FIGS. 3-8 and 16-21 show various perspective views of the body panel and tether fastener assembly 10, 1300 when attached according to one embodiment. According to one embodiment, the strap 30, 730 is operable to bend to allow the fastener tether clip 20, 700 to clip into the tether clip bracket 40 as shown in FIGS. 1-6. The hook finger 540 for example, may attach to body piece 60 via fastening mechanism 530 such as a finger slot as shown in FIG. 2. Alternatively, the hook finger 540 may be a rivet, ultrasonic or heat weld, screw, pin or other suitable fastening mechanism 130, and may be preassembled. Alternatively, the tether strap 30, 730 may be a ribbon cable, strap, flexible tether, weld or a suitable flat cable. As a result, the tether strap 30, 730 may have any suitable amount of material, including portions of varying thickness, such as an elastic material covered by a web or alternatively an externally applied object or device, such as a chain, cable or metal strap, sufficient to sustain any desired amount of detachment force.

According to one embodiment, each of the arms 222, 224, 730 may attach to the slots 232, 732 to elastically tether the clip strap coupler 210 and the bracket strap coupler 710. For example, when the tether clip bracket 40 detaches from the fastener clip 20 which remains attached to the engagement structure 50, such as the vehicle chassis, the detachment force may be absorbed by the elastic multi-strand reinforced material within strap 224, 222, 30, 730 such that the outer web, such as a nylon sheathing acts as a strengthened portion to suitably maintain coupling between the engagement structure 50 and the body panel 70. The body panel 70 is detached from the chassis 50 while at least one strap 30, 224, 222, 30, 730 prevents the body panel 70, from traveling a maximum predetermined distance from the chassis 50. The strap 222, 224 may include a shock absorber, a tear-away portion and a weakened portion or any other suitable mechanism for absorbing all or a portion of the energy due to detachment of the engagement structure 50 from the body panel 70.

Figure 13:
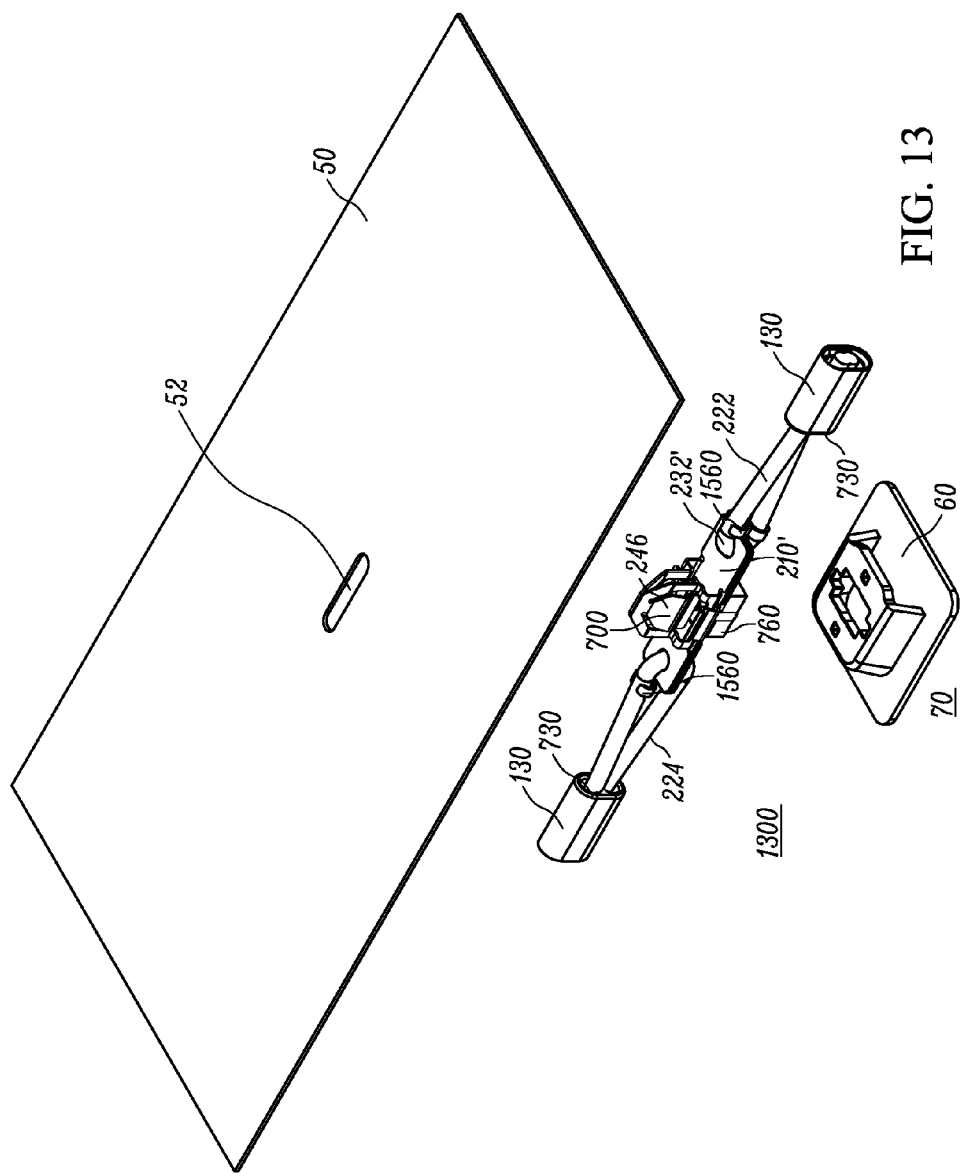
FIG. 13 is a perspective view of the body panel assembly according to one embodiment of the present invention.

As shown in FIG. 13, according to one embodiment, the tether clip bracket 760 of body panel 70 detaches from the fastener clip 700 on engagement structure 50 in response to the impact of a vehicle collision and related events such as air bag deployment. Therefore, the arms 224, 222, 730 may include a sufficient amount of material, such as molded plastic, web reinforcement, nylon sheathing or other suitable material in order to ensure that the first engagement structure or vehicle chassis 50 and the body panel 40 remain coupled via the tether strap 30, 730. Wings 770 and wing depressions 246, on opposing sides of fastener clip 20, 700 engage slot 52 of chassis 50.

Figure 15:
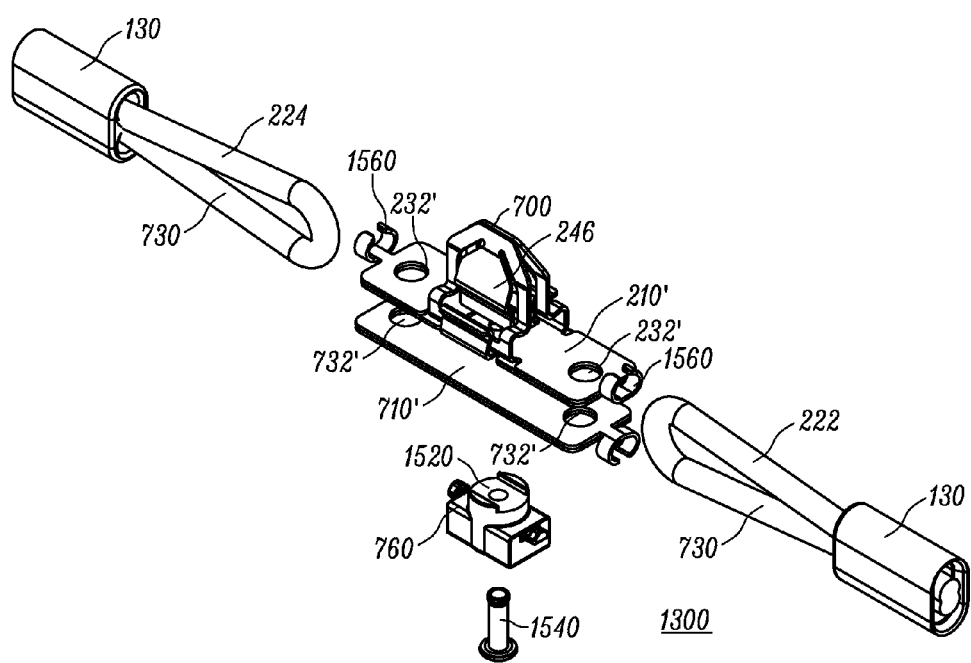
FIG. 15 is a perspective view of a body panel assembly in accordance with the alternative embodiment.
Figure 16:
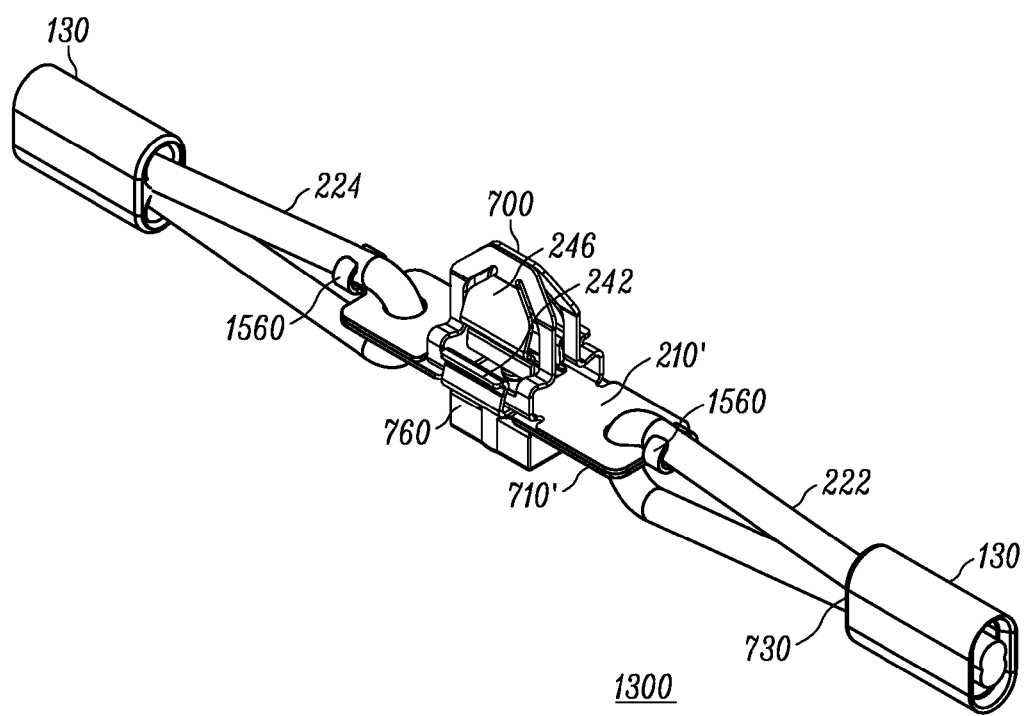
FIG. 16 is a top perspective exploded view of an attached body panel assembly in accordance with the alternative embodiment.
Figure 20:
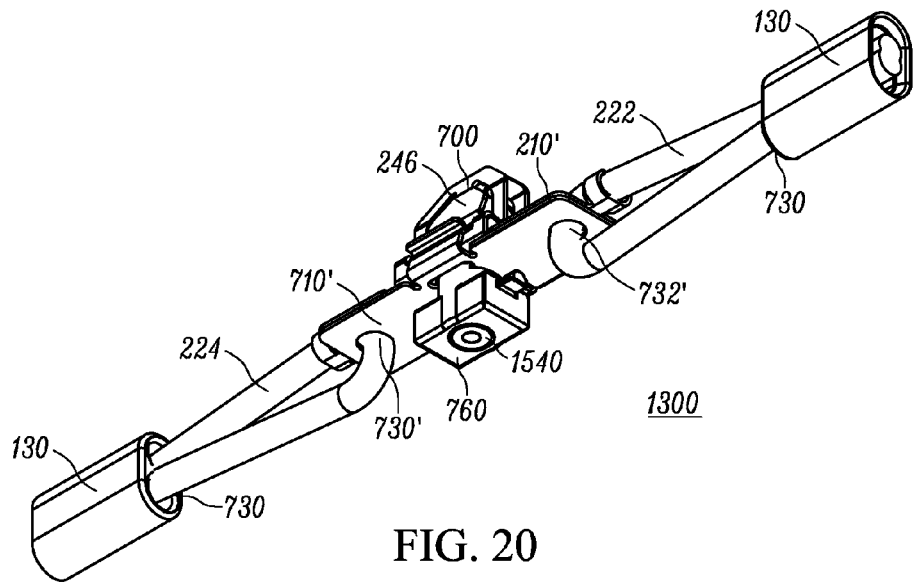
FIG. 20 is a bottom perspective exploded view of an attached body panel assembly in accordance with the alternative embodiment.
Figure 21:
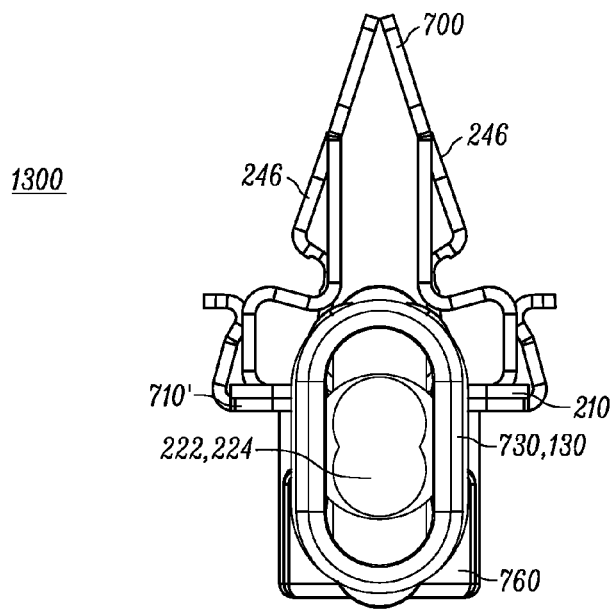
FIG. 21 is a side view of the attached body panel assembly in accordance with the alternative embodiment.

As shown in FIGS. 1 and 15, fastener clip 20, 700 has a slot 720 on its base to couple wings 1520 of the tether clip bracket 760 to engage the slot 720 via fastener 1540 such as a pin or rivet.

As shown in FIGS. 15-23, the first multi-strand reinforced strap 30, 730 attaches to the first end of the clip strap coupler 210, 210' having a slot 232, 232' and to the first end of the bracket strap coupler 710, 710' having a slot 732, 732'. The second multi-strand reinforced strap 30 attaches to the end opposite from the first end of both the clip strap coupler 210 having a slot 232, 232' and the bracket strap coupler 710, 710' having a slot 732.

Figure 14:
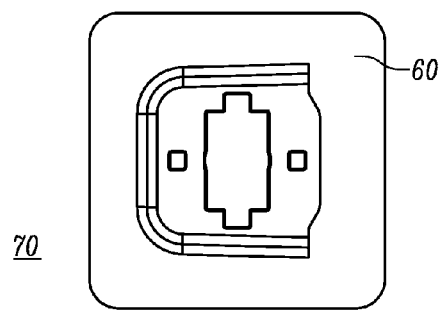
FIG. 14 depicts a tower or post portion of a body panel according to an alternative embodiment.

As shown in FIGS. 15-23, clip strap coupler 210' is housed in clip 200. Bracket strap coupler 710' is attached to tether clip bracket 760. Fastener clip 700 has a slot 720 on its base to couple wings 1520 of the tether clip bracket 760 to engage the slot 720 via fastener 1540 such as a pin or rivet. Turn buckle 220 is attached to clip bracket 760. Turn buckle 220 is inserted into body tower 60 as shown in FIG. 14 and then turn buckle 220 is rotated to attached tether clip bracket 760 to body tower 60.

When in an attached position, the clip strap coupler 210' and the bracket strap coupler 710' are attached via the clip arms 744 on bracket strap coupler 710'. The clip arms 744 has sufficient springing to retain bracket strap coupler 710' with clip strap coupler 210'. For example, the retention force may be between 20 to 70 pounds of force. Clip arms 744 may have a bend, depression or other feature to engage the corresponding edge of clip strap coupler 210'.

In the event of an airbag deployment, clip arms 744 spring open releasing the base of clip strap coupler 210' and the tether strap(s) 30 maintains coupling of the clip strap coupler 210' and bracket strap coupler 710' to allow separation but controlled deceleration until a predetermined distance, as previously described. Wings 1520 of the tether clip bracket 760 detachable engage the base of fastener clip 700. According to this embodiment, the wing 246 of clip 700 directly engages the slot 52 of chassis 50 and remains engaged through deployment of the airbag. The tether clip bracket 760 remains attached to the body panel 70.

In addition to the tether strap 30 going through slot 232', optional strain relief 1560 also improves coupling with the tether strap 30. Strain relief 1560 may be integrated into the base of fastener clip 700. For example, strain relief 1560 may be an extension of material formed from clip strap coupler 210' and bracket strap coupler 710'. The extension of material may be either bent around the tether strap 222, 224 or may be curved to cup the tether strap 222, 224.

Figure 6:
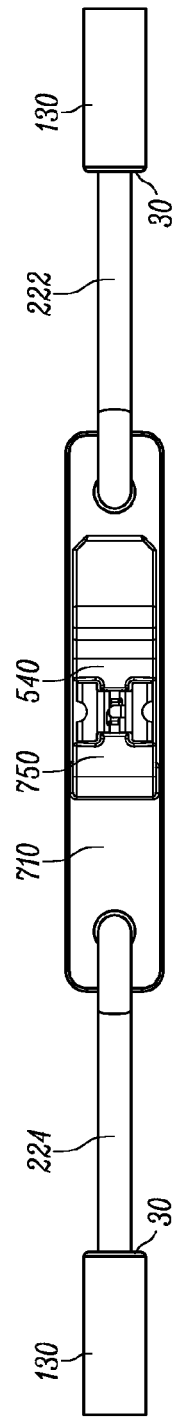
FIG. 6 depicts a bottom view of the tether fastening device.
Figure 7:
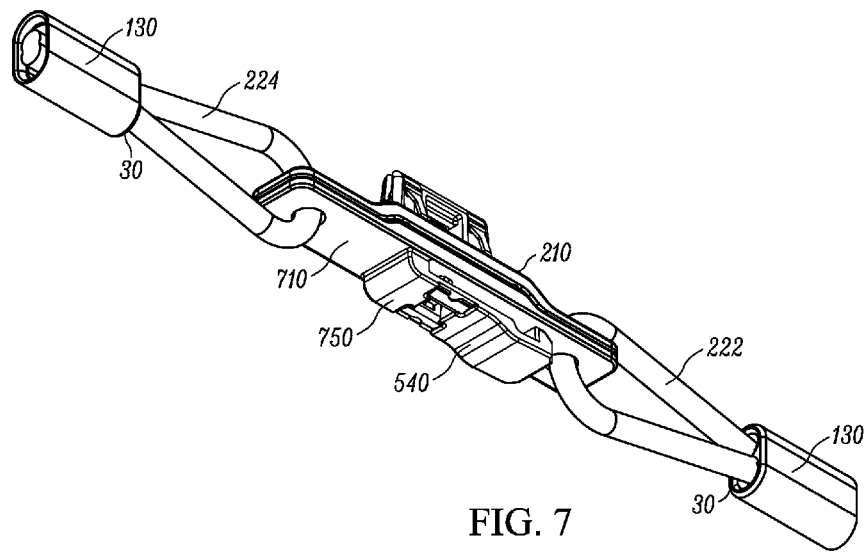
FIGS. 7 and 8 depict a bottom perspective view of the tether fastener.
Figure 8:
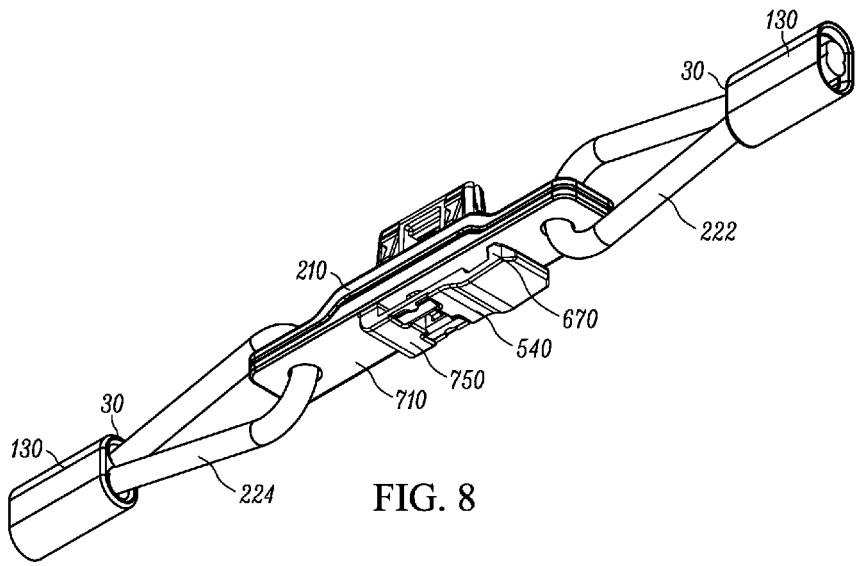
Figure 9:
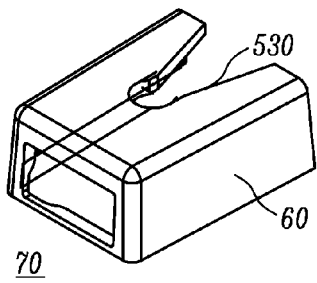
FIGS. 9, 10 and 11 depicts a tower or post portion of a body panel according to another embodiment.
Figure 10:
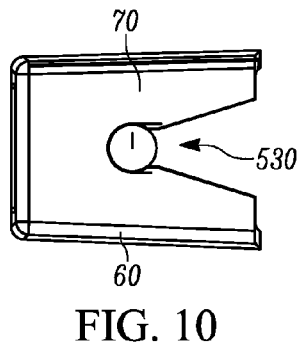
Figure 11:
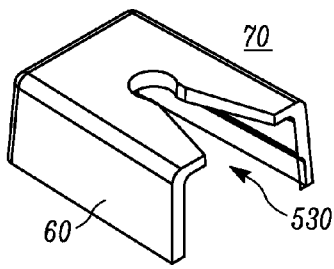

According to one embodiment as shown in FIGS. 6-8, the tether strap 710 includes a grip 750 to facilitate gripping, insertion, and turning of the strap coupler 710 into fastening mechanism 530. For example, an installer may more easily grasp the grip 750 with their fingers to insert and twist the strap coupler 710 into fastening mechanism 530. Although the grip 750 is shown in the shape of a thickened end of the strap coupler 710, the grip 750 may be any suitable shape. The grip 750 may be an "X" (also called an X-stop), or may be formed in any shape such as an "I", "T", "V", "O" or any single or multi-sided object suitable to allow manipulation of the strap coupler 710 into fastening mechanism 530.

As shown in FIGS. 9-11, and 14 the body piece 60, according to one embodiment including the tether clip bracket 40, is attached to a tower or housing of a body panel 70 which may be part of body piece 60. For example, the tether clip bracket 40, fastener clip 220, 700 and body piece 60 may be preassembled for suitable assembly with the vehicle chassis 50. The entire assembly fastens via fastener clip 20, 700 such as the A-, B- or C-pillar or any suitable pillar of an automobile chassis 50, via slot 52. The slot 52 may be sized to allow relatively easy insertion of the fastener clip 20, 700 while resisting separation between the fastener clip 20, 700 and the vehicle chassis 50. The slot 52 may have any shape corresponding to wing 770, 246, such as a rectangle, circle, a square, a rectangle, a pentagon, a hexagon, a polygon, an n-sided polygon where n is a whole number, an ellipse, and/or an oval, or any suitable shape.

Figure 12:
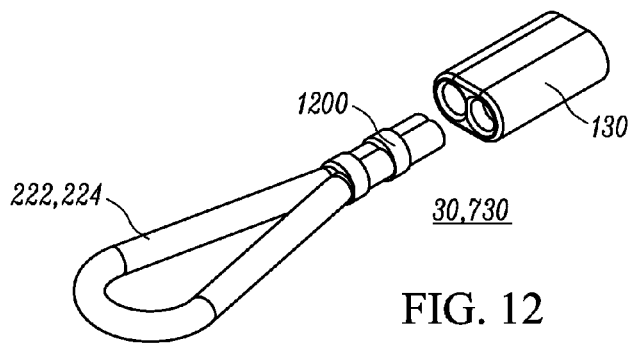
FIG. 12 depicts a tether strap according to one embodiment.

FIG. 12 depicts one example of a strap 730 such as a metal, nylon, carbon fiber or plastic strap 730 attached at one end in an closed loop configuration through fastening mechanism 130 such as a clamp. Other embodiments are possible with legs of different shapes of arms/legs 222, 224, 730 such as different curve radius or bends, coils, angles or any suitable shape to function as a shock absorber.

Figure 3:
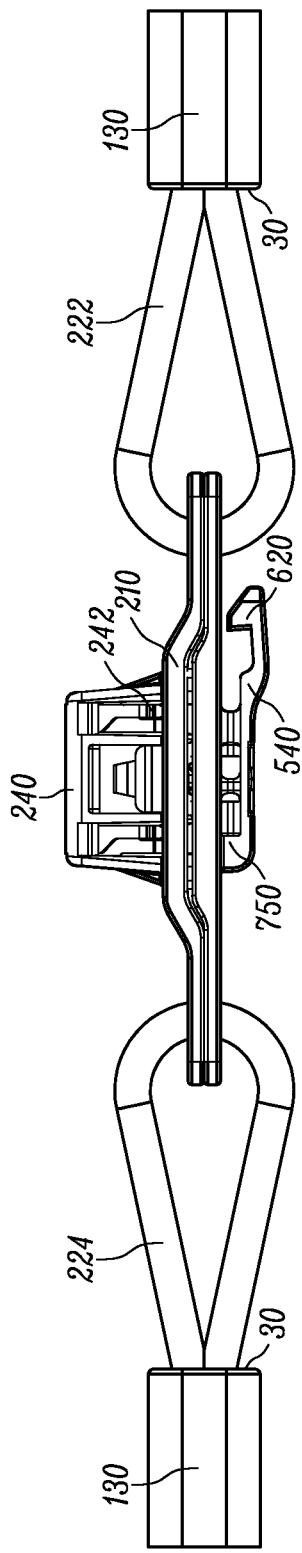
FIG. 3 is a side view of body panel assembly and fastener according to one embodiment of the invention.
Figure 4:
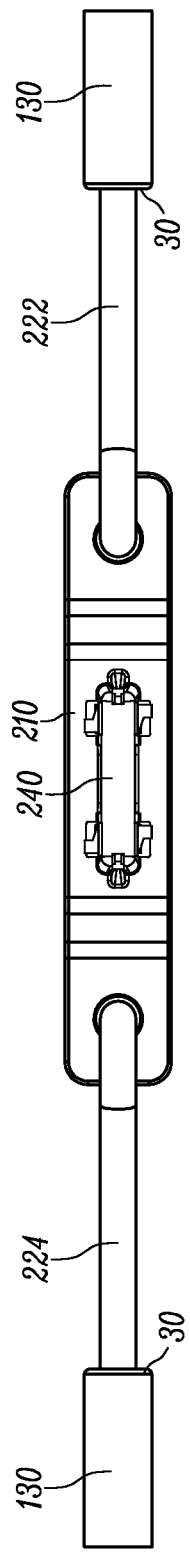
FIG. 4 depicts a top view of a tether fastening device according to this embodiment.

The fastener clip 20 includes a pair of tangs 770 and fingers 780 to engage the tether cap 246 in a tang slot in the tether cap 246 and to suitably engage slot 52 of the vehicle chassis 50. According to one embodiment, the tang 770 includes at least one notch or depression, or bend suitable to increase an extraction force for the fastener clip 700 from the tether cap 246 and/or chassis slot 52 relative to an insertion force. The tang(s) 770 may be sized to suitably engage slot 52 of the vehicle chassis 50 in order to further increase the extraction force. According to one embodiment, a depression may be formed on tang 770 and/or fingers 780. For example, the notch or depression may be formed by stamping one or more tangs and notch 242 (FIGS. 1, 3 and 4). The notch 242 may further include an edge, which may include an abrupt angle, a single angle, multiple angles, continuously changing angles or any suitable size angle in order to permit relatively easy insertion of the fastener clip 20, 700, and tether cap 700 into the slot 52 while increasing the extraction force. The notch 242 may be formed such that any angle may be employed, including 0°, 30°, 45°, 60°, 89°, 145°, and so on. The tether cap 700 further may include tether cap arms 770 and wing depressions 246 suitable for bending when inserted into slot 52 and thus exposing tangs for engagement with slot 52.

The tether clip bracket 40, 760 and the fastener clip 20, 700 provide an uncoupling force according to one embodiment of from at least 20 to 100 lbs. such that, during an impact, the body panel 70 suitably detaches from the vehicle chassis 50 a predetermined distance via the tether strap 30, 730. The fastener clips 20, 700, 40, 760 may be any suitable fastener clip and may be any clip manufactured by Termax Corp. of Lake Zurich, Ill. According to one embodiment, the fastener clip 20, may be fastener clip such as part numbers 27000, 67000, 4405, 4570, 30611, 3842, 4210, and 71500 manufactured by Termax Corp. or any suitable clip. Any component of the body panel and tether fastener assembly 10 may be, for example, molded or extruded or formed from any suitable method from plastic or any suitable material. Alternatively, any component of the body panel and tether fastener assembly 10 may be made from a strip of steel metal on a progressive die. The steps employed may include the formation of shear tabs and punches to form holes and channels as is known in the art. Additionally, rubber, plastic, paint or any suitable coating or covering may be applied in order to reduce buzzing, squeaking and rattling (BSR) during operation of the vehicle.

Other designs are possible, such as an open ended or non-loop strap feature. Although shown with a loop, the tether strap 30 730 may have a shape for example with various curvatures, bends, coils or any suitable combination to further provide shock absorption. For example, if an airbag causes a body panel 70 to detach from the chassis 50, the cap 240 and fastener clip 20, 700 remains with the chassis 50 while the tether clip bracket 40, 760 remains with the body piece 60. The energy caused by the sudden detachment of the body piece 60 is absorbed in part or substantially by the shock absorbers formed in the strap 730, 30 or any suitable component.

A hook finger 540 may be operable to releasably connect to a chassis or body panel 60 such as a B-pillar body panel or other suitable object. For example, the hook finger 540 and corresponding grooves 530 on a body molding may slide through an entry onto a corresponding coupler on body panel 60.

As shown in FIGS. 3 and 8, the hook finger 540 may have a tapered hook 670 to hold and also permit easy insertion of the hook finger 540 into the body panel 60 while permitting detachment. For example, the hook finger 540 may be detached from the body panel 60 by prying the hook finger 540 and optional tapered hook to disengage.

Figure 5:
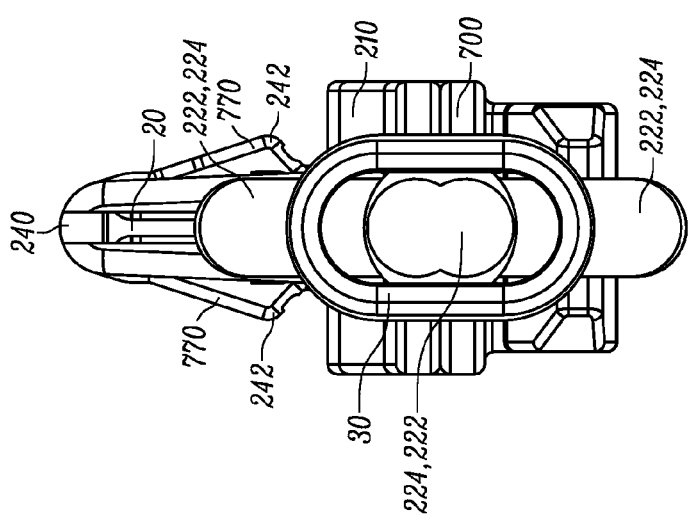
FIG. 5 depicts a side view of the tether fastening device.

FIG. 5 depicts a side view of the tether fastener 600 in an engaged position according to another embodiment such that the clip 40 is engaged in the clip 20. According to this embodiment, a clip 20, 700 is attached to the cap 240 in order to releasably engage the slot 52 of vehicle chassis 50.

The tether cap 700 and arms 770 via wing depressions 246 operably couple to the vehicle chassis and the tether cap 240 is detached from the clip 20, 700 when in a detached mode while the bracket strap coupler 710 remains coupled to the body panel 60.

According to one embodiment, the fastening device 10 may be assembled via the vehicle assembly method comprising:

attaching a bracket strap coupler 710, 710' to a body panel 70;

attaching a clip strap coupler 210, 210' to a vehicle chassis 50;

attaching a fastener clip 20 to the clip strap coupler 210, 210';

detachably coupling a tether clip bracket 40 to the fastener clip 20;

coupling a first multi-strand reinforced strap 30 to: a first end 232, 232' of the clip strap coupler 210, and a first end 732, 732' of the bracket strap coupler 710, 710'; and coupling a second multi-strand reinforced strap 30 coupled to: an end opposite from the first end 232, 232' of the clip strap coupler 210, and an end opposite from the first end 732, 732' of the bracket strap coupler 710, 710'.

Figure 22:
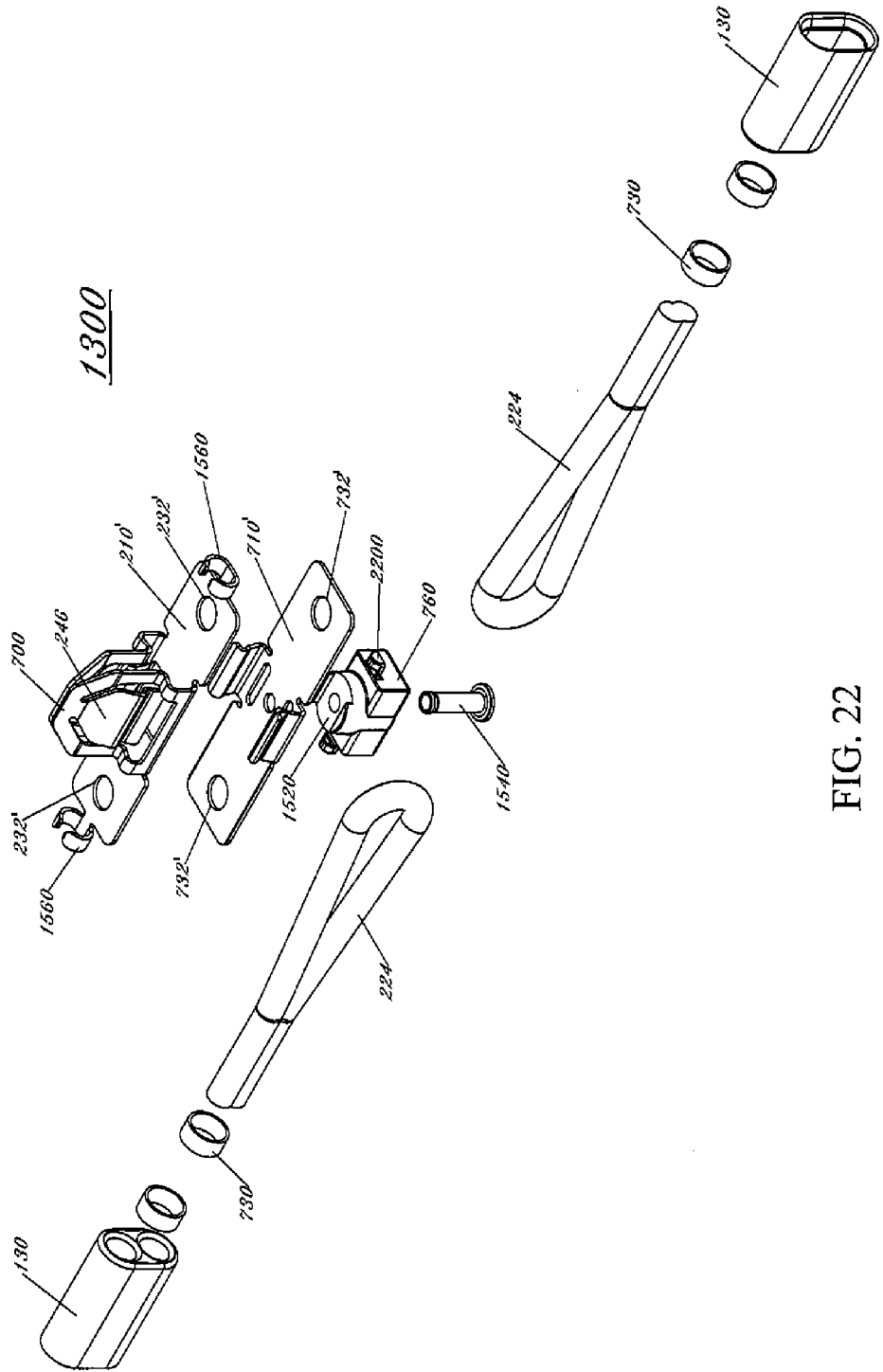
FIG. 22 is a top exploded view of the body panel assembly in accordance with the alternative embodiment.

FIG. 22 is a top exploded view of the body panel assembly in accordance with the alternative embodiment.

Figure 23:
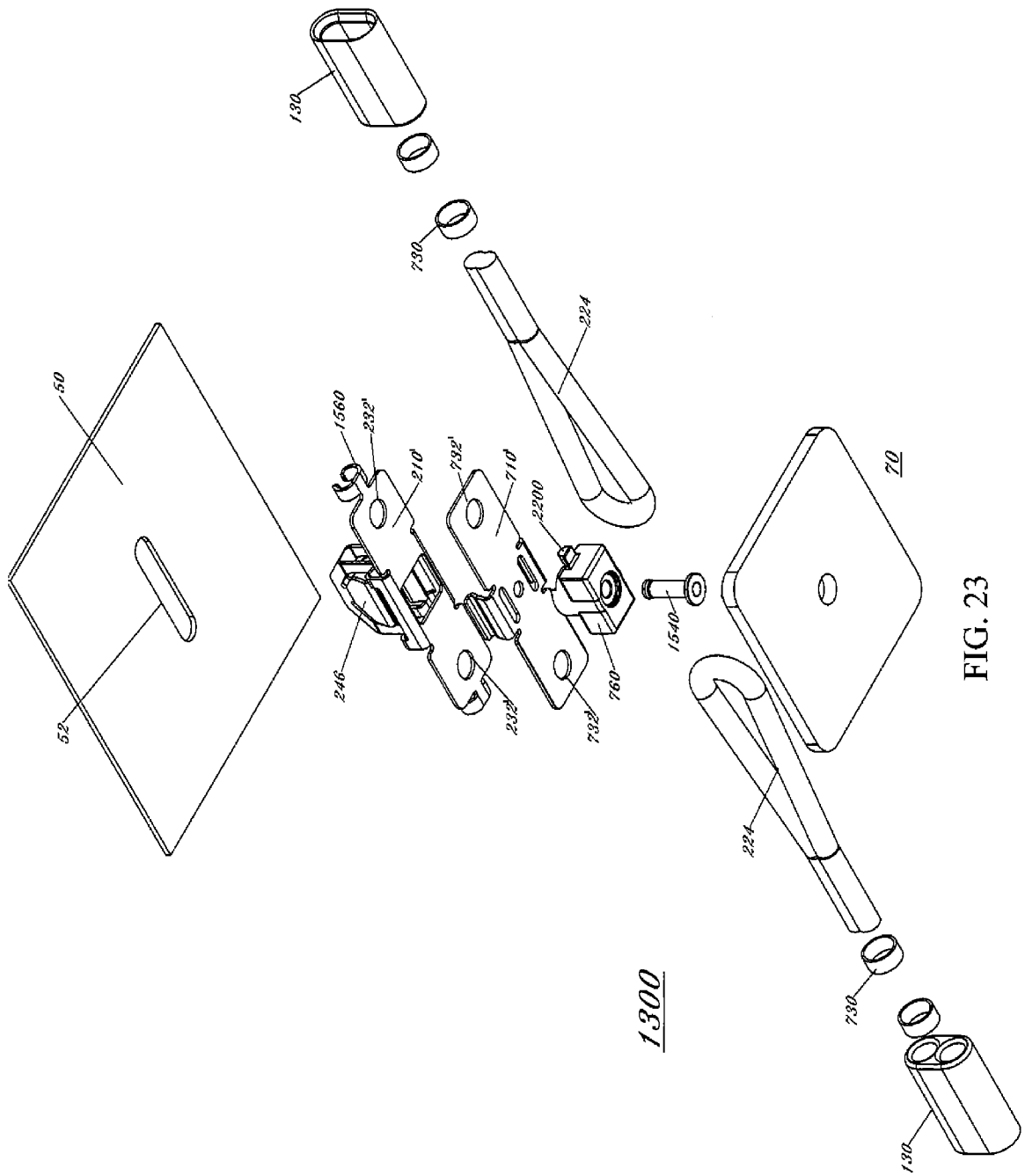
FIG. 23 is a bottom exploded view of the body panel assembly and chassis in accordance with the alternative embodiment.

FIG. 23 is a bottom exploded view of the body panel assembly and chassis in accordance with the alternative embodiment.

Among other advantages, the tether strap forms a loop to couple the clip strap coupler and the bracket strap coupler. By forming a loop, other forms of attaching the tether strap to the fastener clip, such as by a screw, are not needed. The tether fastening device easily facilitates attachment of the vehicle chassis with the second engagement structure, while an integrated strap controls detachment of the vehicle chassis from the second engagement structure. The tether strap absorbs the deployment energy and decelerates the body panel in a controlled manner to avoid breakage of the strap. According to one embodiment the strap has mesh reinforcement over an elastic material to strengthen the strap such that the strap resists breakage and does not allow the body panel to travel more than a predetermined distance. Since the tether clip includes an integrated strap, a body panel assembly may be preassembled with the strap and tether clip already attached and ready for attachment to a vehicle chassis in a single step. As a result, no separate step of attaching a tether strap to the vehicle is required. Since the tether strap is integrated into the tether clip and delivered to, for example, an automobile manufacturer for final assembly, the automobile manufacturer may eliminate the step of attaching the strap to the vehicle chassis, since the tether strap is already integrated into the tether clip. Consequently, assembly costs are reduced, thus reducing a manufacturer's production costs. Further, the tether fastening device reduces the chance of an improper attachment of the tether strap between the vehicle chassis and the second engagement structure, since the tether strap is already integrated with the tether clip at one end and is already attached to the second engagement structure, such as a body panel. In other words, the problem of inadvertently failing to attach the separate tether strap between the vehicle chassis and the body panel is greatly reduced or even eliminated. The tether strap facilitates controlled disengagement of the body panel and the vehicle chassis in order to permit deployment of an airbag, permitting the airbag to travel along a guided path that would otherwise be obstructed by the second engagement structure. Consequently, the use of the tether fastening device decreases production costs and increases productivity and efficiency while further increasing reliability and safety. One skilled in the art would readily recognize the use of the tether fastening device in other applications such as aircraft, space craft, boating, furniture, as well as in home construction.

It is understood that the implementation of other variations and modifications of the present invention in its various aspects will be apparent to those of ordinary skill in the art and that the invention is not limited by the specific embodiments described. It is therefore contemplated to cover by the present invention any and all modifications, variations or equivalents that fall within the spirit and scope of the basic underlying principles disclosed and claimed herein.

What is claimed is:

1. A tether fastening device for a body panel in an automobile chassis comprising:
 a clip strap coupler operatively coupled to the automobile chassis;
 a fastener clip detachably coupled to the clip strap coupler;
 a tether clip bracket detachably coupled to the fastener clip;
 a bracket strap coupler attached to the body panel;
 a first multi-strand reinforced strap coupled to: a first end of the clip strap coupler, and a first end of the bracket strap coupler; and
 a second multi-strand reinforced strap coupled to: an end opposite from the first end of the clip strap coupler, and an end opposite from the first end of the bracket strap coupler.

2. The tether fastening device of claim 1 wherein the bracket strap coupler further comprises a hook finger detachably coupled to a fastening mechanism on the body panel.

3. The tether fastening device of claim 1 wherein:
 the first multi-strand reinforced strap attaches to the first end of the clip strap coupler having a slot and to the first end of the bracket strap coupler having a slot; and
 the second multi-strand reinforced strap attaches to the end opposite from the first end of both the clip strap coupler having a slot and the bracket strap coupler having a slot.

4. The tether fastening device of claim 3 wherein the body panel attaches to the bracket strap coupler with at least one of: glue, rivets, screws, bolt, nut, clips, pins, snaps, and clamps.

5. The tether fastening device of claim 1 wherein the first multi-strand reinforced strap and the second multi-strand reinforced strap are coupled to the clip strap coupler and the bracket strap coupler, to form a continuous loop.

6. The tether fastening device of claim 1:
 wherein ends of the first multi-strand reinforced strap and the second multi-strand reinforced strap are each fastened via a fastening mechanism to couple the ends of the straps.

7. The tether fastening device of claim 1 wherein the first multi-strand reinforced strap and the second multi-strand reinforced strap includes at least one of: a nylon strap, a nylon mesh, a rope, a rubber strap, a cloth strap, a plastic strap, a metal strap, a steel strap, an aluminum strap, a cloth covered rubber strap, a stranded strap, a bungee cord, a cable, a belt, a ribbon and a band.

8. The tether fastening device of claim 1 wherein the fastener clip further includes at least one wing having a depression to engage a slot on the automobile chassis.

9. The tether fastening device of claim 1 wherein the tether clip bracket further includes at least one wing having a depression to detachably couple to a slot on the fastener clip.

10. The tether fastening device of claim 1 further comprising an attached mode when the tether clip bracket is attached to the fastener clip, and a detached mode when the tether clip bracket is unclipped from the fastener clip while tethered with at least one multi-strand reinforced strap.

11. The tether fastening device of claim 1 wherein the body panel is detached from the chassis while at least one strap prevents the body panel from traveling a maximum predetermined distance from the chassis.

12. A body panel and tether assembly for an automobile body structure comprising:
- a body panel;
- a clip strap coupler operably coupled to the automobile body structure;
- a fastener clip detachably coupled to the clip strap coupler;
- a tether clip bracket detachably coupled to the fastener clip;
- a bracket strap coupler attached to the body panel;
- a first multi-strand reinforced strap coupled to: a first end of the clip strap coupler, and a first end of the bracket strap coupler; and
- a second multi-strand reinforced strap coupled to: an end opposite from the first end of the clip strap coupler, and an end opposite from the first end of the bracket strap coupler.

13. The tether fastener assembly of claim 12 wherein the fastener clip further includes at least one wing having a depression to engage a slot on the automobile body structure.

14. The tether fastener assembly of claim 12 wherein:
- the first multi-strand reinforced strap attaches to the first end of the clip strap coupler having a slot and to the first end of the bracket strap coupler having a slot; and
- the second multi-strand reinforced strap attaches to the end opposite from the first end of both the clip strap coupler having a slot and the bracket strap coupler having a slot.

15. The tether fastening device of claim 12 wherein the tether clip bracket further includes at least one wing having a depression to detachably couple to a slot on the fastener clip.

16. The tether fastening device of claim 12 wherein the bracket strap coupler further comprises a hook finger detachably coupled to a fastening mechanism on the body panel.

* * * * *